Jan. 31, 1939.   C. M. WILLIS   2,145,783
AUTOMATIC FLUID TRAP
Filed June 6, 1938   2 Sheets-Sheet 1
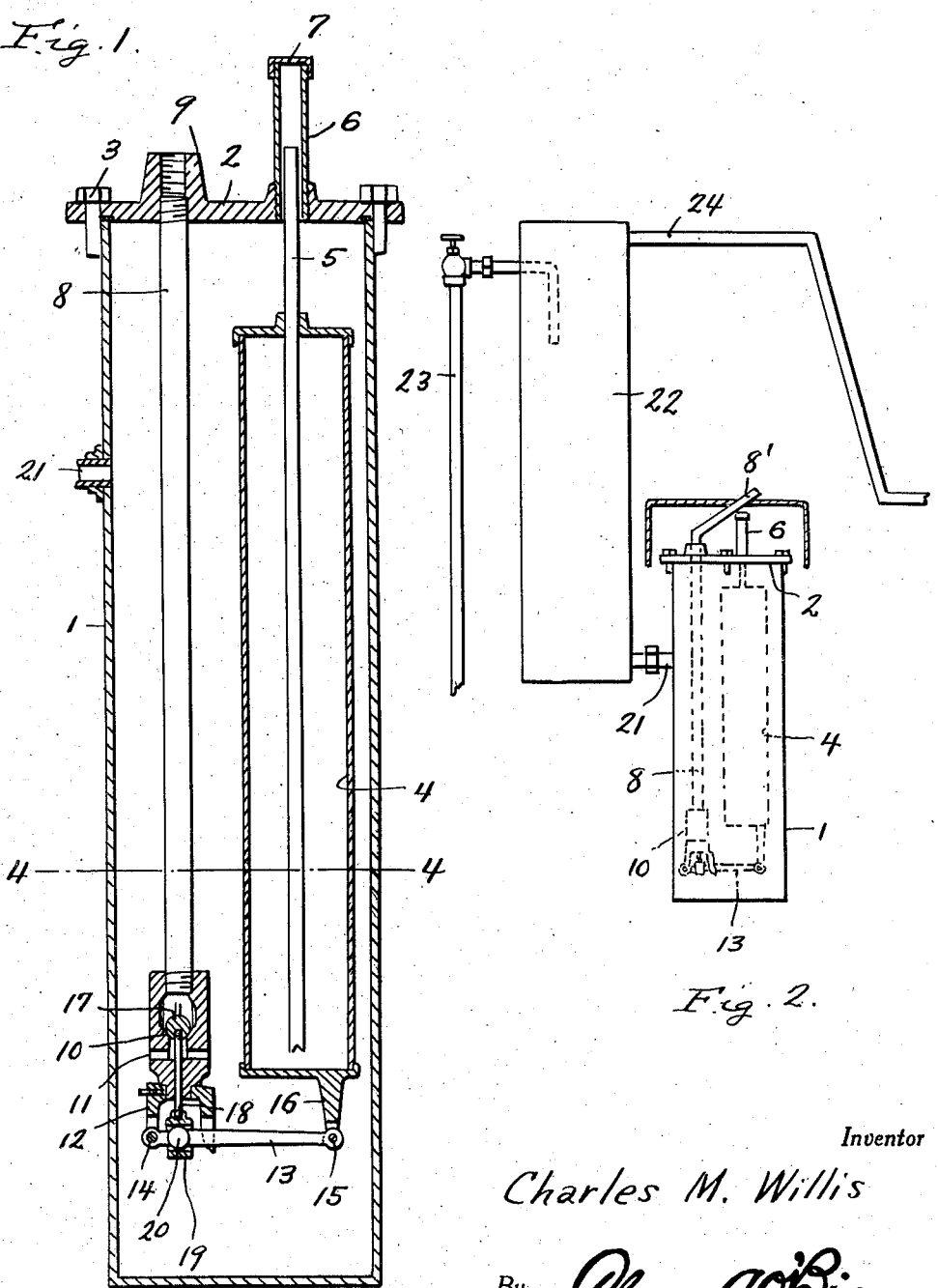
Inventor
Charles M. Willis
By Clarence A. O'Brien
and Hyman Berman
Attorneys

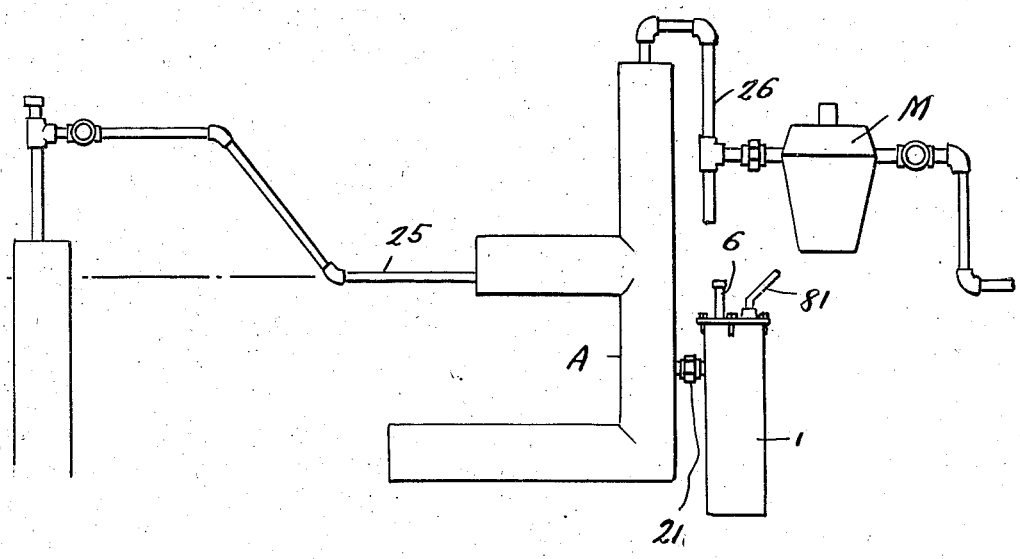
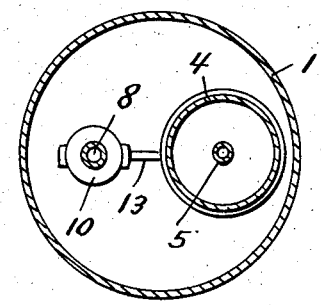

Patented Jan. 31, 1939

2,145,783

UNITED STATES PATENT OFFICE 2,145,783

AUTOMATIC FLUID TRAP

Charles M. Willis, Paola, Kans.

Application June 6, 1938, Serial No. 212,139

2 Claims. (Cl. 137—103)

This invention relates to an automatic fluid trap for gas lines and the like, the general object of the invention being to provide a casing so connected with the line that it will receive water or other liquid passing through the line or parts thereof with the gas, with float controlled valve means whereby the liquid in the cylinder is discharged at intervals by the pressure in the cylinder.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a vertical sectional view through the device.

Figure 2 is an elevation with parts in section showing how the device is connected with a drip tank of a gas well.

Figure 3 is an elevation showing the invention applied to a meter drip member.

Figure 4 is a section on the line 4—4 of Figure 1.

As shown in these drawings the invention comprises a cylinder 1 having a closure member 2 fastened to its upper end in a gas and fluid tight manner by the bolts 3. A cylindrical float 4 is vertically arranged in the cylinder 1 and a combined vent and guide tube 5 passes through the upper end of the float to a point adjacent the bottom thereof and the other end of the tube 5 extends into a tubular member 6 threaded into the cover member 2 and having a closure member 7 at its upper end. A pipe 8 is threaded in a nipple 9 formed on the cover member 2 and a valve casing 10 is connected to the lower end of the pipe 8 and is located in the lower part of the cylinder 1. This casing is formed with a valve seat which slopes downwardly and passages 11 communicate with the interior of the valve body and open out through the sides thereof, these passages being located below the seat. A bracket 12 is fastened to the lower end of the body and is provided with a pair of forked depending parts between one of which is pivoted a lever 13 as shown at 14. The lever passes between the other depending part which acts as a guide for the movement of the lever. The other end of the lever is pivoted as at 15 to a depending part 16 on the bottom of the float 4. A ball valve 17 is adapted to engage the seat and has its stem 18 extending downwardly through the bottom where it connects with a tubular part 19 through which a spherical part 20 on the lever 13 extends. Thus upward movement of the float 4 will cause the lever 13 to open the valve 17 to permit liquid from the casing 1 to flow through the pipe 8 into a discharge pipe 8' which leads to any suitable point remote from the device. An inlet 21 is connected with the upper portion of the casing 1 and this pipe is connected with the line or other part to be drained of water. Figure 2 shows this pipe as connected to the lower portion of a tank 22 which receives the gas from a gas well or the like through a pipe line 23 which introduces the gas into the upper part of the tank and the gas flows from the tank through a pipe 24 connected with the upper end of the tank.

Thus any water flowing into the tank 22 with the gas will collect in the bottom of the tank while the gas passes through the pipe 24. The water will flow through the pipe 21 into the casing 1 with some of the gas and when the water reaches a certain level it will raise the float 4 so that the valve is open and the pressure within the casing 1 forces the water past the valve through the pipe 8 into the discharge pipe 8'. When the level of the water lowers the float will drop and thus close the valve. As the valve opens with the pressure there is no danger of the valve failing to open when the float drops.

Figure 3 shows the invention as being connected to the drip member A which receives the gas from a line 25 and delivers the gas to a meter M through a line 26, the casing 1 being connected by the pipe 21 with a part of this member A.

It will, of course, be understood that the invention can be used wherever it is necessary to separate liquid from gas.

From the foregoing, it will be seen that no gas passes through the described device. The combined vent and guide tube 5 functions in the member 6 to guide the float 4 in its vertical movement and to introduce gas collecting in the casing 1 into the interior of the float 4 by way of the member 6 and the upper end of said tube. Thus the pressure in the float 4 and casing 1 is equalized so that said float is prevented from collapsing when the pressure increases in said casing. By having the combined vent and guide tube 5 extend close to the bottom of the float 4, said float cannot become filled with water in case the valve 17 sticks, as from clogging, and for the reason that the gas in the float 4 will become trapped therein as soon as water rises above the lower end of said tube 5 and will thereby prevent the water from rising in the float to any appreciable extent.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:—

1. An automatic fluid trap for connection in a gas line to receive gas and water from said line comprising an elongated closed casing adapted to be disposed in upright position and having a side inlet port in the upper part thereof for connection to said line and a water discharge port in the upper end thereof, a discharge pipe depending from said discharge port, a valve mounted on the lower end of said discharge pipe and operative for opening and closing, respectively, a vertically disposed cylindrical float in said casing closed at both ends, a tubular guide member upstanding from the upper end of the casing and opening into the latter, said member having a closed upper end, a combined guide and vent tube for said float fixed in the upper end thereof to extend into the float close to the lower end of the latter and having an upper part projecting from said float and freely slidable in said guide member, and operating connections between the lower end of the float and said valve for opening and closing said valve under movement of said float in opposite directions, respectively.

2. An automatic fluid trap for connection in a gas line to receive gas and water from said line comprising an elongated closed casing adapted to be disposed in upright position and having a side inlet port in the upper part thereof for connection to said line, and a water discharge port in the upper end thereof, a discharge pipe depending from said discharge port, a valve mounted on the lower end of said discharge pipe and operative for opening and closing, respectively, a vertically disposed cylindrical float in said casing closed at both ends, a tubular guide member upstanding from the upper end of the casing and opening into the latter, said member having a closed upper end, a combined guide and vent tube for said float fixed in the upper end thereof to extend into the float close to the lower end of the latter and having an upper part projecting from said float and freely slidable in said guide member, and operating connections between the lower end of the float and said valve for opening and closing said valve under movement of said float in opposite directions, respectively, the upper end of said casing being detachable and said pipe, valve, float, guide member and vent tube together with the operating connections being removable from the casing together with said upper end of the latter as a unit.

CHARLES M. WILLIS.